United States Patent [19]

Tischer et al.

[11] Patent Number: 4,649,022

[45] Date of Patent: Mar. 10, 1987

[54] METHOD OF MAKING A CURRENT COLLECTOR FOR A SODIUM/SULFUR BATTERY

[75] Inventors: Ragnar P. Tischer, Birmingham; Walter L. Winterbottom, Farmington Hills; Halina S. Wroblowa, West Bloomfield, all of Mich.

[73] Assignee: Ford Motor Company, Dearborn, Mich.

[21] Appl. No.: 602,796

[22] Filed: Apr. 23, 1984

[51] Int. Cl.$^4$ ............................ B22F 3/00; B22F 3/02
[52] U.S. Cl. .................................. 419/24; 29/419 R; 75/229; 419/5; 419/17; 419/26; 429/104
[58] Field of Search .................. 419/24, 26, 5, 8, 17, 419/30; 75/229, 243, DIG. 1; 429/104; 29/419 R

[56] References Cited

U.S. PATENT DOCUMENTS

| 4,052,535 | 10/1977 | Robinson et al. | 429/104 |
| 4,060,412 | 11/1977 | Divecha | 29/419 R |
| 4,290,192 | 9/1981 | Elkins | 429/104 |
| 4,492,021 | 1/1985 | Wright et al. | 429/104 |

Primary Examiner—Allan M. Lieberman
Attorney, Agent, or Firm—William E. Johnson; Lorraine S. Melotik

[57] ABSTRACT

This specification is directed to a method of making a current collector (14) for a sodium/sulfur battery (10). The current collector so-made is electronically conductive and resistant to corrosive attack by sulfur/polysulfide melts. The method includes the step of forming the current collector for the sodium/sulfur battery from a composite material (16) formed of aluminum filled with electronically conductive fibers selected from the group of fibers consisting essentially of graphite fibers having a diameter up to 10 microns and silicon carbide fibers having a diameter in a range of 500–1000 angstroms.

1 Claim, 2 Drawing Figures

METHOD OF MAKING A CURRENT COLLECTOR FOR A SODIUM/SULFUR BATTERY

STATEMENT

The invention herein described was made in the course of or under a contract or subcontract with the Department of Energy, Contract DE-AM02-79CH10012, Subcontract DE-AT02-79E-25105.

TECHNICAL FIELD

This application is directed to a method of making a current collector for a sodium/sulfur battery, which current collector is electronically conductive and resistant to corrosive attack by sulfur/polysulfide melts. The method finds particular utility in preparing current collectors which may be immersed in sulfur and polysulfide melts, materials which are developed during operation of a sodium/sulfur battery. If desired, the current collector may define an electronically conductive container for sulfur and polysulfide melts which are present during operation of a sodium/sulfur battery.

BACKGROUND AND PRIOR ART STATEMENT

Since the invention of sodium/sulfur batteries, a principal problem associated with their use has been the corrosive action of sulfur and polysulfide melts present during operation of such a battery. Containers for holding such corrosive materials in certain applications must have a long life. For example, if a sodium/sulfur battery is to be used in a load leveling application, the load leveling battery container is expected to have a minimum life of 10 years. Load leveling applications are ones in which electrical energy is stored in a battery during nonpeak load conditions and dissipated from the battery during peak load conditions.

While no specific search was carried out in the U.S. Patent and Trademark Office, we are aware of the following U.S. patents directed to container materials for molten polysulfide salts. These patents will be discussed briefly below, but we feel that they do not in any manner suggest the specific solution to this problem that we are proposing herein. As an additional matter, we are aware of U.S. Pat. No. 4,060,412, issued Nov. 29, 1977, for a "Method for Preparing a Fiber Reinforced Metal Matrix Using Microscopic Fibers", which discloses a composite material which we now disclose as useable as a conductor material for a sodium/sulfur battery. This patent will also be discussed hereinbelow.

U.S. Pat. No. 4,024,320 discloses a current collecting pole associated with an alkali metal/sulfur cell which comprises a first layer of an electronically conducting material which is resistant to corrosive action of sulfur and alkali metal polysulfides (e.g., carbon or graphite). The first layer defines a continuous surface in contact with the surface and alkali metal polysulfides. There is also a second layer of a higher electronically conducting material which is in electrical contact with the first layer over the surface of the latter remote from the sulfur and alkali metal polysulfides. Generally, this patent refers to a graphite or carbon tube with a plated metal outer layer or to a graphite or carbon tube with a plated metal layer inside the tube. The difference in whether the layer is on the outside or on the inside of the carbon tube depends on whether the alkali metal/sulfur cell is of the alkali metal core design or of a sulfur core design.

U.S. Pat. No. 4,052,535 is directed to a sodium/sulfur cell having a solid electrolyte and a cathode current collector with a porous conductive matrix, e.g., carbon or graphite felt. The porous conductive matrix is in the region between the electrolyte and the current collector. The matrix is formed of a plurality of discrete elements with electronically conductive material, e.g., graphite foil, between the elements extending across the region between the current collector and the electrolyte to increase the conductivity across that region.

U.S. Pat. No. 4,125,682 relates to a sodium/sulfur electric cell. The cell comprises a cathode tank containing sulfur, a solid electrolyte tube disposed in the tank and containing sodium. The cathode tube is lined with a continuous strip of felt or fabric which is made of graphite wound in a spiral.

U.S. Pat. No. 4,129,690 discloses a sodium/sulfur cell in which the cathode current collector in the sodium/polysulfide cathodic reactant comprises an impermeable tube, e.g., a carbon or graphite tube, which is inserted into the cathodic reactant and contains a solid metal core, e.g., an aluminum core, and a deformable electronic conductor, e.g., graphite felt, as a conducting interface between the impermeable tube and the core. In this structure the electronic contact between the aluminum rod and the graphite tube is made by graphite felt. Electronic contact in this structure is achieved mechanically, e.g., by graphite felt compression.

U.S. Pat. No. 4,290,192 discloses a method of making a portion of a sodium/sulfur battery which defines the volume for the cathodic reactant materials which are sulfur and sodium polysulfide materials. The container portion is defined by an outer metal casing with a graphite liner contained therein, the graphite liner having a coating on its internal diameter for sealing off the porosity thereof. The steel outer container and the graphite pipe are united by a method which ensures that at operating temperatures of the battery relatively low electrical resistant exists between the two materials because they are in intimate contact with one another.

While several U.S. patents have been mentioned above, there are a substantial number of other U.S. patents which propose answers to the problem of corrosive attack on conductors by sulfur/polysulfide melts. The patents are too numerous to mention and they in fact do not in any way propose the solution to this problem which is proposed in this specification.

This specification proposes that a composite material be used in making a current collector for a sodium/sulfur battery. The current collector so-made is electronically conductive and resistant to corrosive attack by molten sulfur and polysulfide melts under battery operating conditions. The composite material proposed for use in making the current collector material is a material which is disclosed in the aforementioned U.S. Pat. No. 4,060,412. The material taught in that patent is one in which microscopic fibers are mixed with a metal powder such as aluminum to provide a mixture with randomly oriented fibers having the metal particles adhered thereto. The mixture proposed in the patent is extruded at room temperature at least three times and is then placed in a die cavity and subjected to a first pressure at room temperature. While adding no additional pressure, the patent proposes that the die cavity be heated to bring the mixture to a temperature above the solidus of the metal powder, and the volume of the die cavity be decreased to at least the theoretical volume necessary to receive the mixture and ensure that the mixture includeds no voids. The die cavity is then cooled and the resultant billet ejected therefrom. There is no proposal contained in the patent that this material would find any particular utility in the formation of current collectors for a sodium/sulfur battery.

As is well known to those skilled in the art, the principal problem associated with sodium/sulfur batteries is the corrosiveness of the sulfur/polysulfide melt. In order for sodium/sulfur batteries to find use in applications such as load leveling by electric utilities, the battery must have a useful life of at least 10 years. However, it has been found that current collectors for containing a sulfur/polysulfide material, which must also act as electronically conductive members, generally cannot be protected to withstand the sulfur/polysulfide attack for such extended periods of time.

Generally, a sodium/sulfur battery operates in a temperature range of 300°–400° C. There are two basic battery designs currently being used. A first battery design is the so-called "sodium-core" design. The second battery design is the so-called "sulfur-core" design.

In the sodium-core design, the sodium is stored inside a sodium ion conducting ceramic electrolyte which is usually in a form of a closed end cylindrical tube. The sulfur/polysulfide melt is outside the electrolyte with a porous carbon matrix (for example, graphite felt) and is contained within a metal container. During discharge, sodium ions pass through the ceramic electrolyte and combine with sulfide ions on the other side of the electrolyte to form sodium polysulfide. The current within the sulfur electrode is carried by the carbon matrix and sodium polysulfide melt to the outer metal container which acts as the positive current collector for the cell.

In the sulfur-core design, the sulfur/sodium polysulfide melt is stored within the ceramic electrolyte and the sodium is stored outside the electrolyte. In this design, a metal current collector, usually in the form of a cylindrical rod in cylindrical cell designs, is placed inside the electrolyte in the polysulfide melt to act as a current collector. In both designs, the metal current collectors, whether a sulfur container in the sodium-core design or a metal current collector in the sulfur-core design, have to be formed from or be protected by electrically conductive materials that are corrosion resistant to sulfur/polysulfide melts. In addition, such materials have to be capable of withstanding thermal cycling between room temperature and 400° C. without any significant impairment of either the electrical or protective capabilities thereof.

DISCLOSURE OF THE INVENTION

This invention is directed to a method of making a current collector for a sodium/sulfur battery and more particularly to a method of making a current collector for a sodium/sulfur battery which is electronically conductive and resistant to corrosive attack by sulfur/polysulfide melts.

In accordance with the general teachings of the method of our invention, a current collector which is electronically conductive and resistant to corrosive attack by sulfur/polysulfide melts is prepared in the following manner. The current collector is formed for the sodium/sulfur battery from a composite material. The composite material used to form the current collector is an aluminum filled with electronically conductive fibers selected from the group of fibers consisting essentially of graphite fibers having a diameter up to 10 microns and silicon carbide fibers having a diameter in a range of 500–1000 angstroms.

In accordance with preferred teachings of the method of our invention, a current collector which is electronically conductive and resistant to corrosive attack by sulfur/polysulfide melts is prepared in the following manner. A current collector for use in the sodium/sulfur battery is formed from a composite material. The composite material is aluminum filled with electronically conductive fibers selected from the group of fibers consisting essentially of graphite fibers having a diameter up to 10 microns and silicon carbide fibers having a diameter in a range of 500–1000 angstroms. After the current collector is formed, the current collector is treated so as to remove a small layer of aluminum from surfaces thereof which are to be in contact with the sulfur/polysulfide melt. When the so-treated current collector is used in a sodium/sulfur battery, electronically conductive fibers on the surface of the current collector extend outwardly from such surfaces into the sulfur/polysulfide melt to form an electronically conductive path between the sulfur/polysulfide melt and the aluminum of the conductor while a passivating aluminum sulfide surface coating forms on the surface of the aluminum between adjacent ones of the electronically conductive fibers to provide a surface barrier material which is resistant to corrosive attack by the sulfur/polysulfide melt.

In accordance with still further detailed teachings of the method of this invention, the current collector made in accordance with our method may be a container or a protective lining material for a metal container for the so-called sodium-core design of a sodium/sulfur battery. On the other hand, for a sulfur-core design sodium/sulfur battery, the current collector may be the single metal current collector used therein or may be a lined metal current collector material depending upon the particular deisgn desired.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures, and in which:

BEST MODE AND INDUSTRIAL APPLICABILITY

The following description is what we consider to be a preferred embodiment of the current collector for the sodium/sulfur battery in accordance with our inventive concept. The following description also sets forth what we now contemplate to be the best mode of constructing such a current collector and using that current collector in a sodium/sulfur battery. The description is not intended to be a limitation upon the broader principles of this construction, and while preferred materials are used to form the construction in accordance with the requirements of the laws, it does not mean that other materials cannot be used to make this construction.

In illustrating the preferred embodiment of the method of our invention, we will discuss the so-called sodium-core design of a sodium/sulfur battery in which the current collector made by the method of our invention will in fact be a metal container having a lining of material which is electronically conductive and resistant to corrosive attack by sulfur/polysulfide melts.

Figure 1:
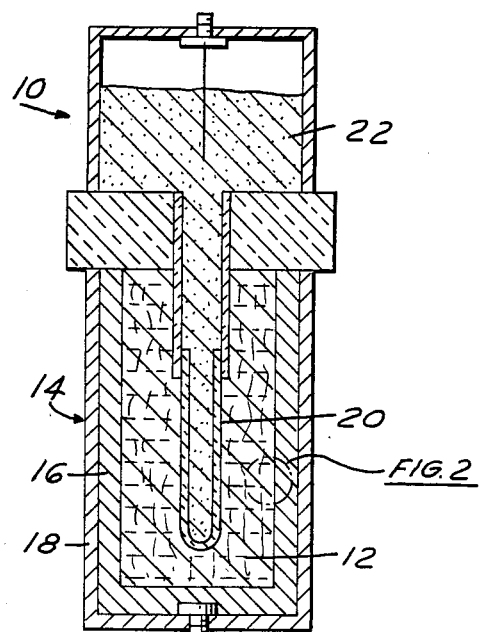
FIG. 1 is an elevation view in cross-section showing an assembly made to define a portion of a sodium/sulfur battery in accordance with the teachings of this invention.

As may best be seen in FIG. 1, there is shown a sodium/sulfur battery, generally designated by the numeral 10, of the so-called sodium-core design. In this design, positive reactant materials 12 are confined between the side walls of a positive reactant container 14 which is made up of a composite material 16 and a metal container 18, as will be described hereinbelow, and an electrolyte material 20, as is well known in the art. A negative sodium compartment 22 is also provided. During operation, on the discharge cycle thereof, sodium in the negative compartment gives up an electron to the external circuit and the resulting sodium ion passes through the electrolyte 20 into the reactant material 12. This material is the corrosive material to be protected against by the conductive container formed in accordance with the teachings of the method of this invention.

Upon recharge of the sodium/sulfur battery 10, as is well known in the art, the sodium polysulfide material contained in the reactant container 14 gives up electrons to the external circuit, thus permitting sodium ions to migrate through the electrolyte material 20 back into the compartment 22 to form elemental sodium. This cyclical operation of the sodium/sulfur battery between charged and discharged states is well known in the art. This cycling has substantial potential for use in the load leveling field as described above.

In accordance with the method of this invention, the current collector, in the preferred case a material which helps to form the reactant container 14, is formed in the following manner. A composite material container 16 is formed, for example, in an extension operation using material such as described in the aforementioned U.S. Pat. No. 4,060,412. The material that we have found to be useable is one in which aluminum is used as the metal matrix and the microscopic fibers may be either silicon carbide fibers mentioned in the patent or graphite fibers also mentioned in the patent. The formed composite material 16 can be bonded to the metal container 18 by thermal shrunk-fitting or soldering or welding.

Figure 2:
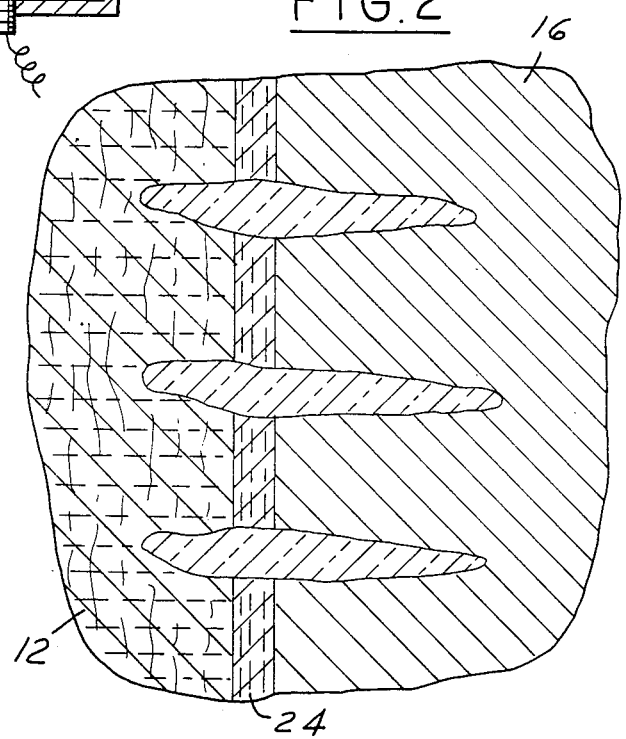
FIG. 2 is an enlarged area of FIG. 1 showing greater details of the structure of FIG. 1.

After the reactant container 14 has been formed as above described, it may be assembled with the other components of the sodium/sulfur battery 10 and used therewith. The composite material 16 serves not only as an electronically conductive material, but also as a material which is resistant to corrosive attack by sulfur/polysulfide melts. The material is electronically conductive because individual ones of the microscopic fibers contained in the material along the surface thereof are effective, as shown in FIG. 2, to conduct electronically between the cathodic reactant materials 12 and the bulk aluminum of the composite material.

As described in the aforementioned patent, the composite material 16 generally consists of 70-90% by volume of aluminum with 30-10% by volume of the microscopic fibers. The microscopic fibers, as described in the patent, are selected from a group of fibers consisting essentially of graphite fibers having a diameter up to 10 microns and silicon carbide fibers having a diameter in a range of 500-1000 angstroms. The composite material is resistant to the sulfur/polysulfide melts of the reactant materials 12 because the reactant materials do in fact initially react with the aluminum to form an aluminum sulfide barrier material 24. As is best seen in FIG. 2, the aluminum barrier material forms on the aluminum between adjacent ones of the electronically conductive ceramic fibers when the sodium/sulfur battery is in operation.

In accordance with more detailed aspects of the method of this invention, better electronic properties can be achieved from the construction of our invention by treating the container after its formation. By better characteristics we mean increased load carrying capability with no increase in cell resistance. The treatment is carried out on the container after formation thereof to remove some aluminum from the surfaces of the composite material 16 to be in contact with the molten cathodic reactant materials 12 thereby to produce a pristine surface. One way of treating the composite material is to subject the material to an etching process. A preferred etching process is one in which a solution of 50 grams of sodium hydroxide in one liter of water at room temperature is applied to the surface for a period of time of 2-10 minutes. This treatment does expose more current carrying fibers at the surface.

Once again, when the composite material 16 is used in the cell, the individual microscopic fibers contained therein at the surface thereof provide the electronically conductive passageways to the bulk aluminum therebelow. Also, as aforedescribed, the bulk aluminum reacts with the sulfur/polysulfide melts at the surface thereof to form the aluminum sulfide barrier material 24 between individual ones of the microscopic fibers to provide the polysulfide protection. The aluminum sulfide barrier so-formed is one which is nonconductive, nonporous and protects the aluminum from corrosion.

While the specific embodiment described above is one in which a sodium-core design is used and the composite material 16 is used as a lining within a metal container 18, it is possible to construct the entire reactant container 14 of the composite material 16 if one desires. Also, if one desires to make a sulfur-core design of a sodium/sulfur battery, the composite material 16 may be placed on a suitable metal current collector or may be used by itself.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method of making a current collector for a sodium/sulfur battery, which current collector is electronically conductive and resistant to corrosive attack by sodium/polysulfide melts, which method comprises the step of:

forming said current collector for said sodium/sulfur battery from an evenly dispersed microscopic composite material formed of 70-90% by volume of aluminum filled with 30-10% by volume of electronically conductive fibers selected from the group of fibers consisting essentially of graphite fibers having a diameter up to 10 microns and silicon carbide fibers having a diameter in a range of 500-1000 angstroms; and treating said current collector after formation thereof so as to remove aluminum from surfaces thereof to be in contact with sodium/polysulfide melts, whereby surface ones of said electronically conductive ceramic fibers extend outwardly from said surfaces into said sodium/polysulfide melts and an aluminum sulfide surface coating can form on said aluminum between adjacent ones of said electronically conductive ceramic fibers when said sodium/sulfur battery formed using said current collector is in operation.

* * * * *